Jan. 26, 1960 C. W. HARRISON 2,922,965

APERTURE EQUALIZER AND PHASE CORRECTION FOR TELEVISION

Filed Aug. 9, 1956 2 Sheets-Sheet 1

INVENTOR
C. W. HARRISON
BY Hugh S. Wertz
ATTORNEY

INVENTOR
C. W. HARRISON
BY
Hugh S. Wertz
ATTORNEY 2,922,965
Patented Jan. 26, 1960

2,922,965

APERTURE EQUALIZER AND PHASE CORRECTION FOR TELEVISION

Charles W. Harrison, Gillette, N.J., assignor to Bell Telephone Laboratories, Incorporated, New York, N.Y., a corporation of New York Application August 9, 1956, Serial No. 603,008

2 Claims. (Cl. 333—28)

This invention relates to image transmission systems, and more particularly to equalizing arrangements for use in such systems.

In telephotographic or television systems, the image field is generally scanned by moving a spot or elemental area along some recurring geometrical path over this field. By virtue of the finite size of the scanning spot, the signal intensity indicative of a particular portion of the image field is averaged out over a relatively large area with a resulting loss in picture detail.

With this lack of detail caused by the finite spot size, there is associated an equivalent filter characteristic that describes the loss. Accordingly, insertion of an equalizer into the system offers a convenient and practical method for providing compensation for the effective aperture loss of the system. Theoretically, an equalizer may be designed to exactly correct the loss, but, in practice, the amount of allowable equalization is dependent on the noise threshold, since enhancing the gain to make up for loss at the higher frequencies also enhances the noise. Moreover, in systems wherein the scanning aperture is symmetrical, the effective filter characteristic is one that has linear phase. Therefore, if the amplitude equalizer is not to cause overall phase distortion in such systems, it must exhibit a linear phase characteristic with constant delay at all frequencies in the pass band.

In the past, aperture equalizer design trends were toward the use of a minimum-phase loss section and an all-pass phase equalizer wherein the loss section gave the high frequency amplitude correction, while the all-pass phase equalizer corrected for the phase distortion of the loss section. However, such equalizing systems are complex and lack the flexibility of adjustment that is particularly desirable in such an equalizer.

Accordingly, it is the principal object of this invention to compensate for aperture distortion resulting from the finite size of a scanning spot while simplifying the equipment necessary to accomplish the desired equalization.

Still another object is to achieve adjustable phase equalization together with adjustable gain equalization in a simplified equalizing system.

Yet, another object is to compensate for high frequency attenuation introduced by virtue of an aperture characteristic.

Previously developed adjustable equalizing networks have typically been of the so-called "transversal type." In such an equalizer, input energy is supplied to a delay system that is terminated at the opposite end in a manner to prevent the occurrence of reflections. Signals obtained from a number of points disposed along the delay system are appropriately weighted and then combined in a predetermined manner to provide a suitably equalized output signal. In order to maintain the proper phase characteristic, the delay device signal takeoff terminals are symmetrically distributed along the line with reference to a center or midtap point. By employing equal amounts and like polarities of the signals on each side of this midtap point, the equalizer may be made inherently "phaseless." Thus, when the secondary signals obtained from the taps on each side of the maintap correspond to a small number of preceding and succeeding elements of the picture in a localized region of a single horizontal line, equalization in the horizontal direction is produced. Similarly, when the main signal is combined with secondary signals from the corresponding elements of preceding and succeeding lines, vertical-direction equalization is realized. A combination of vertical and horizontal equalization is produced by combining the two. For a more detailed description of equalizers of this general type, reference may be made to an application of B. M. Oliver, Serial No. 197,466, filed November 24, 1950, now Patent 2,759,044, August 14, 1956.

According to the present invention, the desirable features of the aforementioned equalizer together with desirable additional high frequency phase correction are realized in a simplified equalizer. More specifically, the several objects of the invention are realized in a correcting circuit comprising a delay system having at one end means for providing reflections along the delay system, and means for applying an input signal to the other or input end of the delay system. The signals which appear at a number of terminals located along the length of the delay system, being symmetrically disposed in time about a signal obtained at the misterminated end of the system, are combined in a predetermined manner to provide a suitably equalized output signal.

In one simple illustrative embodiment of the invention, the delay device is provided with a reflective termination other than an open circuit whereby a nonlinear phase versus frequency characteristic is produced. This can be achieved, for example, by employing any termination which does not produce even symmetry in the echo pattern. Examples of terminating devices of this type will be described hereinafter.

It is thus apparent that the erstwhile midtap signal is actually obtained at the misterminated end of the delay system rather than from the "midtap," and the echo signals that appear at the terminals along the delay device are disposed about this end point signal. For example, in the case of an open circuit condition, the delay system causes the signal to be reflected back through the system without distortion and without a change in sign so that each terminal produces both an advanced and a delayed version of the signal with respect to the erstwhile midtap signal. It will be appreciated that application of this principle affords a considerable simplification of both the delay system structure and its associated circuitry. For example, a two-to-one saving in vacuum tubes and circuitry for the combining network may be realized permitting a substantial reduction in physical size of the unit. The production of an extremely compact adjustable phase equalizer suitable for use in television equipment is thus economically feasible.

It is to be understood that the invention is applicable to both receiving and transmitting equipment, for either vertical or horizontal aperture correction, the latter choice being dependent upon the total delay time utilized and the choice of takeoff points. The invention itself, however, will be more fully understood from the following more detailed description taken in conjunction with the accompanying drawings forming a part thereof, in which.

Figure 1:
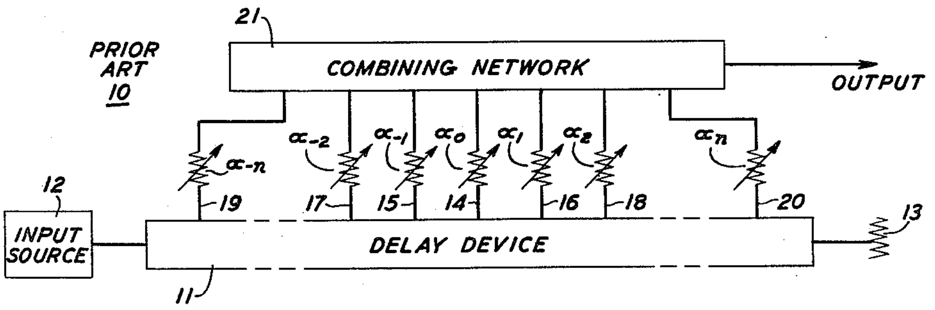
Fig. 1 shows in block diagram form a typical transversal type of equalizer arrangement and corresponds substantially to Fig. 1 in the aforementioned Oliver patent.

Referring more particularly to the drawings, in Fig. 1 an equalizer arrangement of the type fully described in the above-mentioned Oliver patent is shown in block schematic form. This arrangement comprises a substantially lossless delay line 11 which, for example, can be a delay cable or a series of cables, one end of which is supplied with the input signal from a source 12, and the other end of which is terminated in the characteristic impedance 13 of the line in order to minimize reflections back along the line. Symmetrically disposed about a main central tap 14 are a plurality of pairs of secondary taps of which each pair is separated from the central tap by successive integral multiples of a base delay $$\frac{1}{2W}$$

where W is the band of frequencies to be transmitted. By way of illustration there are shown the two pairs nearest the central tap comprising taps 15 and 16, and 17 and 18, and the outermost pair made up of taps 19 and 20. The number of pairs necessary is determined by the degree of equalization desired. There is associated with each tap an attenuation section, representing the amounts by which the signals at the various secondary taps are to be attenuated with respect to the main signal from the central tap 14. Corresponding to the main tap 14 and the secondary pairs 15 and 16, 17 and 18, and 19 and 20, these attenuation sections are designated $\alpha_0$, $\alpha_{-1}$ and $\alpha_1$, and $\alpha_{-2}$ and $\alpha_2$, and $\alpha_{-n}$ and $\alpha_n$, respectively. In the event that no phase equalization is necessary, the attenuation $\alpha_k$ is made equal to the attenuation $\alpha_{-k}$. However, if both phase and amplitude equalization are desired, attenuation $\alpha_k$ will in general not be equal to attenuation $\alpha_{-k}$. The signals from all of the taps are supplied to the adder 21 for summation into the output signals. The output signal comprises a predetermined combination of these weighted tapped signals.

A detailed mathematical analysis of the operation of this equalizer arrangement may be found in the above-mentioned Oliver patent.

Figure 2:
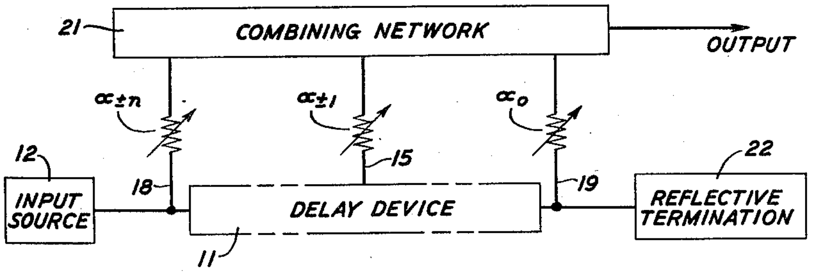
Fig. 2 shows in block diagram form the circuit details of one embodiment of the aperture equalizer of the present invention.

Referring now to Fig. 2, a simple aperture corrector, according to the present invention, comprises a delay system 11 which is supplied with input signals from matched source 12 in a manner similar to that described in connection with Fig. 1. The other end of the delay system 11 is connected to terminating means 22 in such a manner that a portion of the input signal is reflected back down the delay system. As mentioned above, source 12 is preferably matched to delay device 11 so that no further reflections are produced by virtue of the signals returning down the line toward the input end. While this condition will be assumed for purposes of illustration hereinafter, it is to be understood that a matched condition is not essential to the operation of the system. Moreover, it is to be understood that device 22 may include not only a passive linear impedance ranging from a short circuit to an open circuit, but also a reactive network. The main signal corresponding to the main tap signal 14 above is obtained from the end of the delay system at terminal 19 and, as a result, there are obtained from symmetrically disposed terminals 15 and 18, signals which represent both the advanced and delayed versions of the input signal. Since it is to be understood that any convenient number of such terminals may be utilized depending upon the degree of compensation desired, the block representing delay device 11 is shown partially by dashed lines. It is apparent that the signals that appear at these taps are each disposed in time about the end signal. As in the arrangement of Fig. 1, attenuation sections $\alpha_0$, $\alpha_{\pm1}$, $\alpha_{\pm2}$ may be included in each of the terminal lines and the signals may be combined in a network 21 in a manner to be described hereinafter.

In order to obtain phase correction, it is desirable for the reflected signals to differ from those sent down the line originally. If we let $V_a$ represent the incident voltage component arriving at the receiving end of the delay system 11, and $V_a'$ represent the corresponding reflected voltage, then from conventional circuit theory $$V_a'=\beta V_a \quad (1)$$

where $$\beta=\frac{Z_2-Z_0}{Z_2+Z_0}$$

$Z_2$ represents the impedance of the terminating means 22, and $Z_0$ represents the characteristic impedance of the delay system 11.

By then assuming the input source to consist of an electromotive force $e$ in series with an impedance $Z_0$, the voltage $V_s$ at the input end of the line may be represented by $$\frac{V_s}{0.5e}=1+\beta\epsilon^{-2\tau p} \quad (2)$$

and the voltage $V_r$ appearing at the receiving end of the delay device may be written as $$\frac{V_r}{0.5e}=(1+\beta)\epsilon^{-\tau p} \quad (3)$$

where $p=j\omega$ and $\tau$ represents the one-way delay of the line.

If we form an equalizer characteristic by subtracting an arbitrary fraction A of $V_s$ from $V_r$, then the effective characteristic may be written as $$Y(p)=(1+\beta)\epsilon^{-\tau p}-A(1+\beta\epsilon^{-2\tau p}) \quad (4)$$

This may conveniently be written in the form $$\epsilon^{\tau p}Y(p)=2(1-A\cos\tau\omega)+(\beta-1)(1-A\epsilon^{-\tau p}) \quad (5)$$

The first parenthesis on the right-hand side of the equation represents the normal phaseless component obtained with an open-circuit termination, and the remaining term represents a combined phase and amplitude contribution which is proportioned to the departure of the termination from the open-circuit ($\beta=1$) condition.

Figure 3:
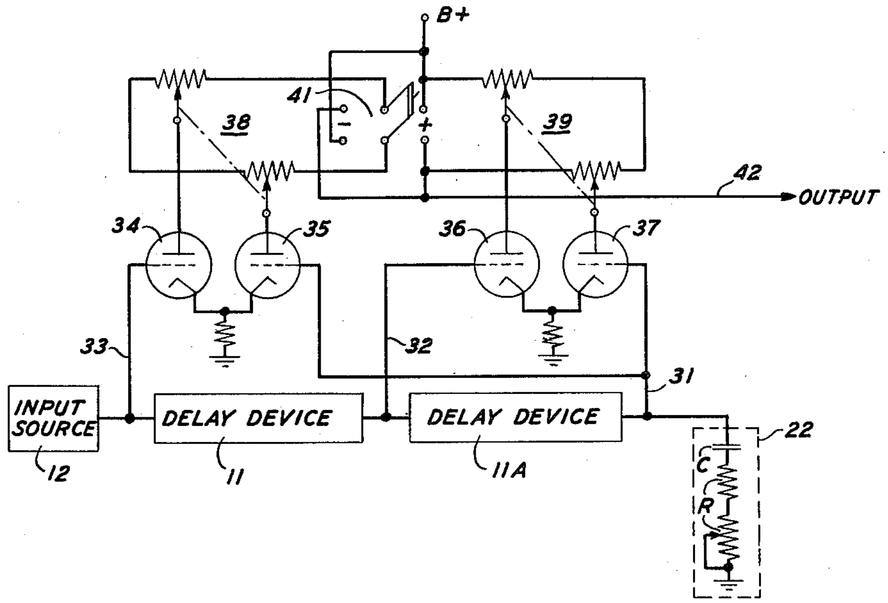
Fig. 3 shows in partial schematic diagram form the circuit details of a preferred embodiment of the aperture equalizer according to the invention.

For purposes of illustration, there is shown in Fig. 3 a preferred form of terminating means 22 wherein the impedance $Z_2$ is determined by the series combination of capacitor C and resistor R, in which R is is a few times greater than the characteristic impedance of the line. At the high frequencies, capacitor C presents a negligible reactance and the resistor R partially terminates the line so that the reflected signal is somewhat weaker than the arriving signal and phase shift is produced. For the lower frequencies, ractance of C eliminates the partial termination, more reflections are produced, and the phaseless behavior of the original delay device is restored. It will be observed that the reflective termination means 22 may be suitably chosen to have a wide range of frequency characteristics in both phase and amplitude.

Moreover, in accordance with the invention, the signals obtained from the terminals disposed along the delay system may be combined in network 21 in a number of ways, i.e., by varying the polarity and amplitude of the signals before combination. For example, by use of appropriate attenuation sections together with a frequency responsive terminating means, adjustable phase equalization may be readily achieved.

In Fig. 3 there is illustrated, diagrammatically, a preferred embodiment of this invention in which the reflective terminating means 22 comprises the series RC circuit described above in connection with Fig. 2, together with an exemplary circuit for combining the various secondary signals with the main tap signal. In this figure, signals from an input source 12 are supplied to the delay system 11–11A, and by virtue of the termination 22 are reflected back down the line, the amplitude of reflections being a function of the frequency as described above. While a single delay device with a plurality of distributed taps or terminals of the type described and illustrated in connection with Figs. 1 and 2 may be conveniently used, separate delay elements serially connected may likewise be employed in the practice of the invention. The erstwhile midtap signal, which appears at terminal 31 located at the end of the line 11, is combined both with a signal obtained from a terminal 32 and with the signal appearing at terminal 33, connected to the input of the delay line, in a combining network including electron discharge devices 34, 35, 36, and 37. While tubes 34 through 37 are conveniently illustrated as triodes, it is to be understood that other types of electron discharge devices, e.g., pentodes, multi-unit devices within a single envelope, or solid state devices may be utilized in any manner well known to those skilled in the art.

Each signal obtained from one of the taps 32 and 33 of the delay system is applied to the grid of one of the vacuum tubes. For each signal so applied, the erstwhile midtap signal from terminal 31 is also applied to a tube, the two tubes of each such combination being connected as a linear mixer. Thus, a mixture of signals from the midtap 31 and the input tap 33 is obtained from the mixer V34—V35 and is controlled by a dual potentiometer 38. Similiarly, a mixture of the midtap signal and the two signals appearing at the terminal 32 is obtained from the mixer V36—V37 and controlled by another potentiometer combination 39. The outputs of the two potentiometers, 38 and 39, are mixed in either the additive or subtractive sense by virtue of switch 41, and supplied as an output signal on lead 42 for further amplification or utilization in the conventional manner. An arrangement of this type is particularly advantageous because it has been found that the attenuating sections included in the circuit of Fig. 2 affect the low frequency gain as well as the high frequency boost. By means of the mixer circuit described above, variation of the high frequency gain independent of the low frequency gain is simply and economically achieved.

It is to be understood, however, that other linear mixing arrangements of any kind well known in the art may be utilized for this purpose. In practice, it has been found that cathode coupled mixers are particularly advantageous inasmuch as they minimize loading of the delay device.

Figure 4:
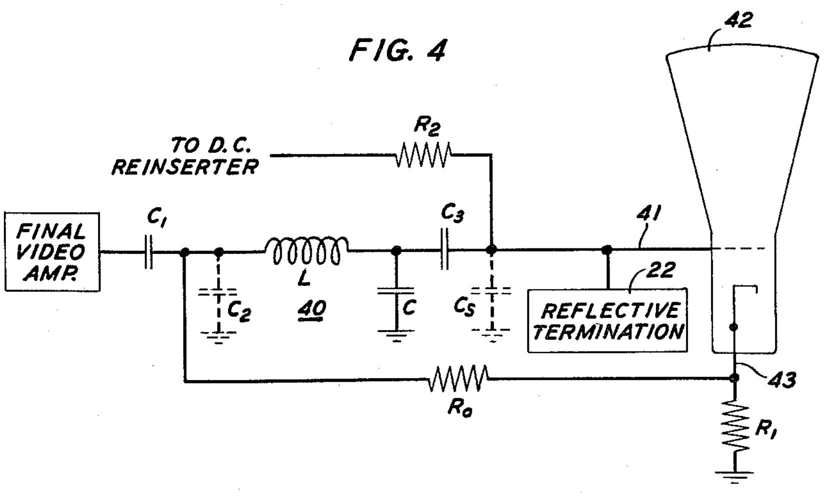
Fig. 4 is a schematic representation of an exemplary arrangement in accordance with the present invention adapted particularly for use in television receiving equipment.

Fig. 4 shows an equalizer incorporating the present invention adapted for use between the final video amplifier and the kinescope in a conventional television receiver. Signals from the final video amplifier are coupled to the kinescope 42 through circuit 40 in which capacitor C and inductor L act as a delay line with an effective delay of one-eighth microsecond which corresponds to $$\frac{1}{2W}$$

for the conventional television signal. The delay line is terminated at the input end by resistors $R_0+R_1$ (assuming the kinescope internal impedance to be negligibly high), the stray capacity of the output circuit of the final video amplifier (0.4C) forming part of the delay line. The other end of the delay line is misterminated by reflective termination 22 which may take the form described above or may simply be an open circuit. The stray capacity $C_S$ associated with the grid 41 of the kinescope also becomes a part of the delay line capacitance C. The signal obtained from the misterminated end of the network 40 is coupled to the grid 41 of the kinescope 42. The delayed and advanced signals which appear at the input end of the delay network are combined through resistive divider $R_1$ and $R_0$ and applied to the cathode 43 of the kinescope. It is thus apparent that the combining network in this case includes the resistive network $R_0$, $R_1$, and linear mixing of the video signals occurs in the cathode-grid circuit of the kinescope. The resistor $R_2$ and capacitor $C_3$ enable the brightness of the kinescope to be independently controlled. Through this application of the invention, aperture correction for enhancing the rendition of video signals in conventional television monitoring circuits is provided in a simple and economical manner.

It can be appreciated that, in general, other techniques can be employed for realizing the necessary delays, and further that a variety of terminating means may be advantageously employed. Further, it is to be understood that all of the above-described arrangements are merely illustrative of the principles of the invention. Numerous other arrangements and modifications may be devised by one skilled in the art without departing from the spirit and scope of the invention.

What is claimed is:

1. An aperture-correcting circuit comprising a multistage delay means including an input terminal, an output terminal, and a plurality of intermediate terminals between said input terminal and said output terminal, said delay means being terminated in its characteristic impedance at its input terminal, and by a frequency responsive reflective terminating means at its output terminal, a source of representative input signals, means for coupling said source of input signals to said input terminal, means for obtaining a plurality of delayed signals from said intermediate terminals, said plurality of delayed signals being operated in time by the interval $$\frac{1}{2W}$$

where W is the bandwidth of said input signals, means for obtaining a signal at said output terminal of said delay means, a first combining means comprising a plurality of linear mixers, each of said linear mixers comprising electron-discharge apparatus including a first control element and a first output terminal, a second control element and a second output terminal, and potentiometer means for adjusting the amplitude of the signals developed at the first and second output terminals, means for applying said plurality of delayed signals respectively to the first control element of selected ones of said linear mixers, means for applying said signal obtained from said output terminal of said delay means to the second control element of all of said linear mixers, and a second combining means including switching apparatus for combining said signals developed at each of said output terminals of said linear mixers in either the additive or subtractive sense to produce intermediate output signals, and means for combining said intermediate output signals to produce an output signal.

2. A correcting circuit comprising a multistage delay means including an input terminal, an output terminal and a plurality of auxiliary terminals intermediate said input terminal and said output terminal, said delay means being terminated in its characteristic impedance at its input terminal and by a frequency responsive reflective terminating means at its output terminal, means for coupling a source of input signals to said input terminal, means for obtaining a plurality of delayed signals from said auxiliary terminals, said plurality of delayed signals being separated in time by the interval $$\frac{1}{2W}$$

where W is the bandwidth of said signals applied to the input terminal, means for obtaining a signal at said output terminal of said delay means, a plurality of linear mixers, means for applying one of said signals obtained from said auxiliary terminals respectively to each one of said mixers, means for applying said signal obtained from said output terminal of said delay means to each one of said mixers, and means for combining in either the additive or subtractive sense the signals developed by each of said mixers to produce a corrected output signal.

References Cited in the file of this patent

UNITED STATES PATENTS

| | | |
|---|---|---|
| 2,263,376 | Blumlein et al. | Nov. 18, 1941 |
| 2,273,163 | Wilson | Feb. 17, 1942 |
| 2,465,840 | Blumlein | Mar. 29, 1949 |
| 2,651,739 | Chudleigh | Sept. 8, 1953 |
| 2,750,534 | Anderson | June 12, 1956 |
| 2,757,236 | Bedford | July 31, 1956 |
| 2,759,044 | Oliver | Aug. 14, 1956 |
| 2,760,167 | Hester et al. | Aug. 21, 1956 |

FOREIGN PATENTS

| | | |
|---|---|---|
| 837,251 | Germany | Apr. 21, 1952 |